(12) United States Patent
Padilla et al.

(10) Patent No.: US 9,990,485 B2
(45) Date of Patent: Jun. 5, 2018

(54) ANTI-PASSBACK ALGORITHM FOR READING A PUBLIC OR SECURE OBJECT

(71) Applicant: Assa Abloy AB, Stockholm (SE)

(72) Inventors: Toby Mark Padilla, Lakewood, CO (US); David Edward Andresky, Lafayette, CO (US); Bryan Stephen Holloway, Edgewater, CO (US); Kieran Wingfield, Cardiff (GB); Michael Margraf, Westminster, CO (US)

(73) Assignee: ASSA ABLOY AB (SE)

( * ) Notice: Subject to any disclaimer, the term of this patent is extended or adjusted under 35 U.S.C. 154(b) by 214 days.

(21) Appl. No.: 14/866,417

(22) Filed: Sep. 25, 2015

(65) Prior Publication Data

US 2016/0092666 A1  Mar. 31, 2016

Related U.S. Application Data (60) Provisional application No. 62/056,361, filed on Sep. 26, 2014.

(51) Int. Cl.
| | | |
|---|---|---|
| *G06F 21/34* | (2013.01) | |
| *G06F 21/62* | (2013.01) | |
| *G06F 21/32* | (2013.01) | |
| *H04B 5/00* | (2006.01) | |
| *G07C 9/00* | (2006.01) | |

(52) U.S. Cl.
CPC ............ *G06F 21/34* (2013.01); *G06F 21/32* (2013.01); *G06F 21/6245* (2013.01); *G07C 9/00111* (2013.01); *G07C 9/00309* (2013.01); *H04B 5/0062* (2013.01); *G07C 2209/08* (2013.01)

(58) Field of Classification Search
None
See application file for complete search history.

(56) References Cited

U.S. PATENT DOCUMENTS

| | | |
|---|---|---|
| 5,473,318 A | 12/1995 | Martel |
| 2003/0081746 A1 | 5/2003 | Ahlstrom et al. |

(Continued)

FOREIGN PATENT DOCUMENTS

| | | |
|---|---|---|
| EP | 0733999 | 9/1996 |
| WO | WO 01/26048 | 4/2001 |

OTHER PUBLICATIONS

"Anti-passback management," AMAG Technology Inc., © 2005, 2 pages [retrieved from: http://literature.puertoricosupplier.com/021/GK20986.pdf].

(Continued)

*Primary Examiner* — Kaveh Abrishamkar
(74) *Attorney, Agent, or Firm* — Sheridan Ross P.C.

(57) ABSTRACT

An anti-passback algorithm for an access control system is described. The anti-passback algorithm prevents the use of valid credentials to gain access to an access-controlled area by more than one person within a given period of time. The algorithm is capable of distinguishing between credentials intentionally presented to the access control system and credentials that are unintentionally read by the access control system. Certain variables may be set by the access control system manufacturer or a trusted individual to adapt the algorithm for applications.

20 Claims, 5 Drawing Sheets

(56) References Cited

U.S. PATENT DOCUMENTS

2006/0119469 A1* 6/2006 Hirai ................... G07C 9/00111
  340/5.61
2008/0313556 A1* 12/2008 Zhang ..................... G06F 21/36
  715/765
2016/0092666 A1* 3/2016 Padilla ................ G07C 9/00111
  726/27

OTHER PUBLICATIONS

Partial Search Report for European Patent Application No. 15186868.4, dated Mar. 16, 2016 8 pages.

* cited by examiner

ANTI-PASSBACK ALGORITHM FOR READING A PUBLIC OR SECURE OBJECT

CROSS-REFERENCE TO RELATED APPLICATIONS

This application claims the benefit of U.S. Provisional Patent Application Ser. No. 62/056,361, filed Sep. 26, 2014, the entire disclosure of which is hereby incorporated herein by reference.

FIELD OF THE INVENTION

The present invention is generally directed to access control systems utilizing credentials encoded in a smart card, UHF tag, or other non-biometric device to control access to a protected resource, and more particularly to preventing circumvention of such access control systems.

BACKGROUND

Access control systems that rely on the presentation, by an authorized user, of credentials encoded in a smart card, UHF tag, or other non-biometric device to control access can in some instances be defeated by passback schemes, wherein an individual uses a given set of credentials to obtain access and then "passes back" the same credentials for use by a second individual. For example, many companies provide a smart card to their employees, which card must be presented to a card reader to gain access to a secured facility. On any given occasion, once an employee uses the card to enter the secured facility, the employee could, while the access control mechanism is still open, pass the card to a non-employee, thus permitting the non-employee to gain unauthorized access to the secured facility. Access control systems used to restrict access to paying customers may be defeated in a similar manner, resulting in lost revenue for the controlled-access area's owner.

SUMMARY

The present disclosure describes an anti-passback mechanism useful for limiting the use of passback schemes to gain unauthorized access to an access-controlled area, without the need for ground loops, optical sensors, or other equipment commonly used for ensuring the integrity of access control systems. Anti-passback mechanisms according to the present disclosure may be used in card readers or other access control systems to limit the number of times a particular identification device may be used to gain access within a given time period.

In most Ultra-High Frequency (UHF) access control systems (e.g., systems utilizing UHF signals between approximately 300 MHz and 3 GHZ to exchange information), the UHF reader is an active device that simply reads tag data and reports the data to the access control panel. In the current market, UHF readers poll for an Electronic Product Code (EPC), and, for each poll attempt in which an EPC is read, report that data to the access control panel (either via a wired or wireless connection). If the polling is repetitive, data will be re-read and re-reported to the panel. If the polling frequency is high (e.g., greater than ten polls per second), the repeating data stream may overwhelm the panel and/or require the need for specialized algorithms in the panel to treat (e.g., implement special screening or masking of duplicate events) repeated data entry occurrences. Additionally, UHF readers will read and report UHF tags that are in the vicinity of the reader so long as an adequate return signal is received by the reader. Given that there is no distinction between intentional and stray tag presentations, UHF connected panels must utilize special algorithms to discern which tag is permitted.

In the current disclosure, duplicate data reports are treated by implementing a firmware-based algorithm to ensure only one event is reported for one intended tag presentation. Using a series of counters and timers and a tag inventory tracking mechanism, an EPC from an intentional tag presentation can be discerned from EPCs from stray tag presentations. The intentionally presented EPC can then be reported to the access control panel once during the intended tag presentation.

In some applications of UHF readers and tags, such as parking lot access control, it can be expected that the tag will be within the RF field for an extended period of time. The anti-passback mechanism ensures that a tag is only reported to the access control panel once (e.g., even though a tag is read multiple times by the UHF reader, the UHF reader only reports a single instance of a tag read event to the control panel). It is also expected that there may be, for example, a queue of vehicles waiting to enter a parking lot, and tags from vehicles other than the one closest to the reader will occasionally be read—potentially multiple times. The series of counters and timers and the tag inventory tracking mechanism associated with the anti-passback mechanism will prevent a tag that is occasionally read from having its data repeatedly sent to the panel. This is also true for other tags in the vicinity. For example, data from tags of other vehicles in the vicinity, such as vehicles in other traffic lanes, will not be repeatedly sent to the panel.

In some embodiments, a reader for an access control system comprises a polling module configured to scan for and read an identification code from a data storage device; a counting module configured to calculate a read counter value, a poll counter value, and an anti-passback counter value each time the polling module conducts a scan; a database module configured to store the identification code read by the polling module, and further configured to store the read counter value, the poll counter value, and the anti-passback counter value; and a reporting module configured to transmit identification information obtained from the data storage device when the read counter value reaches a predetermined maximum read counter value.

The counting module of the access control system reader may be configured to increment the read counter value when the polling module reads the identification code. The counting module may be further configured to decrement the poll counter value from an initial nonzero value each time the polling module scans for an identification code, but only if the anti-passback counter value is equal to zero. The counting module may be still further configured to decrement the anti-passback counter value each time the polling module scans for an identification code, but only if the anti-passback value is nonzero.

The counting module may also be configured to set the anti-passback counter value to a non-zero predetermined maximum anti-passback counter value when the read counter value reaches the predetermined maximum read counter value.

In embodiments of the access control system reader described above, at least one of the identification code and the identification information is an EPC. In further embodiments, at least one of the identification code and the identification information is an SIO.

Also in embodiments of the access control system reader described above, the database module is configured to clear the identification code, the read counter value, the poll counter value, and the anti-passback counter value from storage when both the anti-passback counter value and the poll counter value are equal to zero.

According to some embodiments of the present disclosure, an access control system, comprises a reader comprising an antenna configured to generate electromagnetic signals and facilitate information exchanges with one or more tags that are presented within a read range of the reader; a driver circuit configured to provide an excitation signal to the antenna at periodic intervals, thereby enabling the antenna to poll for one or more tags within the read range at periodic intervals; a processor configured to receive information regarding whether or not one or more tags responded to the poll initiated by the driver circuit; and a data structure that maintains, for each tag that responds to the poll, an identification code and an associated poll counter, read counter, and anti-passback counter, wherein the poll counter maintains a value corresponding to a number of times that the reader polls for tags after the tag first responds to the poll, wherein the read counter maintains a count for a number of times that the tag is read after the tag first responds to the poll, and wherein the anti-passback counter is assigned a value of zero after the tag first responds to the poll.

In some embodiments of the access control system, the anti-passback counter is assigned a predetermined nonzero anti-passback counter value when the poll counter reaches a predetermined poll counter value and the read counter reaches a predetermined read counter value. Also in some embodiments, after the anti-passback counter is assigned the predetermined nonzero anti-passback counter value, the anti-passback counter decrements from the predetermined nonzero anti-passback counter value each time the reader polls for tags until the anti-passback counter reaches a value of zero, unless the reader reads the identification code before the anti-passback counter reaches a value of zero. Additionally, in some embodiments the anti-passback counter resets to the predetermined nonzero anti-passback counter value if the reader reads the identification code before the anti-passback counter reaches a value of zero.

In certain embodiments of the access control system, the data structure clears the identification code and associated poll counter, read counter, and anti-passback counter from storage when the poll counter reaches a predetermined poll counter value and the anti-passback counter has a value of zero.

In accordance with further embodiments of the present disclosure, a method for preventing circumvention of an access control device having an Ultra-High Frequency reader, comprises polling, at a standard interval and with the Ultra-High Frequency reader, for an identification code from a data storage device; incrementing a read counter every time the identification code is read during the polling step, until the read counter reaches a predetermined maximum value; transmitting, from the Ultra-High Frequency reader, identification information obtained from the data storage device when the read counter reaches the predetermined maximum value; decrementing one of a poll counter and an anti-passback counter after each standard interval; and resetting the read counter to zero or null after either the poll counter or the anti-passback counter is decremented to zero.

In embodiments, the method further comprises setting the anti-passback counter to a predetermined anti-passback counter value after the read counter reaches the predetermined maximum value and the poll counter reaches a value of zero.

Also in embodiments, the method further comprises resetting the anti-passback counter to the predetermined anti-passback counter value if the anti-passback counter has a non-zero value and the identification code is read during the polling step.

In still further embodiments of the method, the identification information is at least one of an EPC and an SIO.

DETAILED DESCRIPTION

Figure 1:
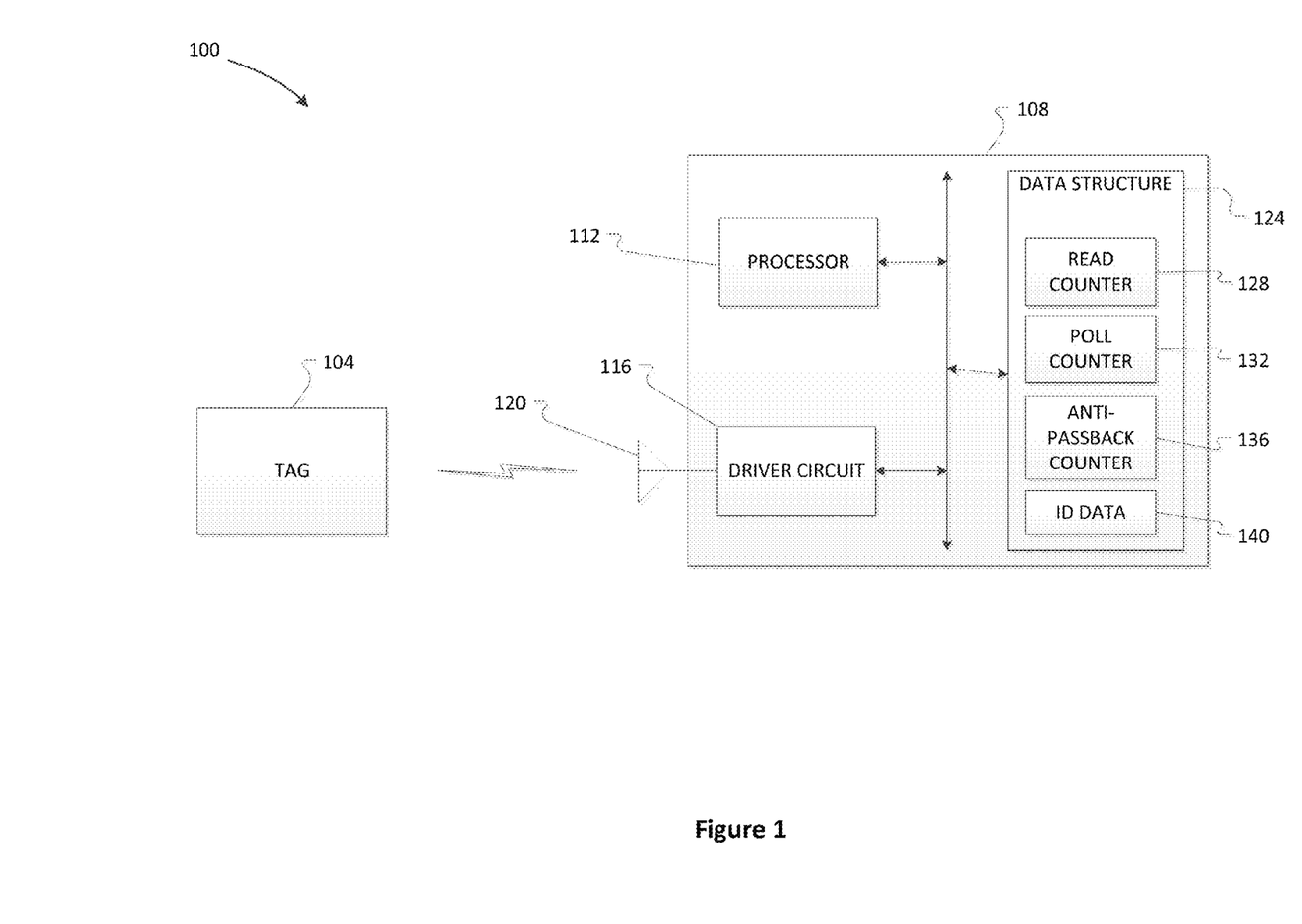
FIG. 1 is a block diagram of an access control system according to one embodiment of the present disclosure.

Referring initially to FIG. 1, an exemplary access control system 100 includes one or more credentials or tags 104 associated with authorized users of the resource protected by the access control system, and a reader 108 configured to grant access to the protected resource upon recognition of an authorized tag 104. In this embodiment, reader 108 is configured with an anti-passback mechanism according to the present disclosure. In operation, the reader 108 of access control system 100 polls for data over wireless antenna 120 on a given time interval. The interval is preferably less than or equal to 40,000 microseconds, more preferably less than or equal to 20,000 microseconds, even more preferably less than or equal to 1500 microseconds. The data may include a message having as many as 65,525 bits, but preferably having only 210 bits. The data may also include as many as 255 leading bits, but preferably includes only 25 leading bits. The data may be any data useful for identification purposes, including an EPC or a Secure Identity Object™ (SIO) (HID Global Corp., Austin, Tex.).

In an embodiment, the access control system reader 108 maintains a table or other data structure 124 in which tag identification data (ID data) 140 is stored along with an associated read counter 128, poll counter 132, and anti-passback (APB) counter 136. In operation, the read counter 128 increments for each read of a given set of tag ID data 140, from zero up to a predetermined maximum, where it stays until the tag ID data 140 is purged from the table or data structure 124. Only when the read counter 128 increments to the predetermined maximum is the tag ID data 140 (or credentials associated with the tag ID data 140) sent to the access control panel for authentication.

The poll counter 132 is assigned a predetermined nonzero value (e.g., an integer value between 3 and 100) after the first read of the tag ID data 140, and thereafter decrements with each poll (whether or not the tag ID data 140 is read again during the poll) as long as the APB counter 136 is set to zero. The APB counter 136 is set to zero after the first read of the tag ID data 140 and remains zero until the read counter 128 hits its predetermined maximum. Once the predetermined maximum value for the read counter 128 is reached, the APB counter 136 is assigned a predetermined nonzero value, and thereafter decrements with each poll until reaching zero. If the reader 108 reads the tag ID data 140 again before the APB counter 136 reaches zero, however, then the APB counter 136 is reset to the predetermined maximum value.

In an embodiment of the present disclosure, a reader 108 of an access control system 100 that uses EPCs for identification may maintain and update a table or data structure 124 as illustrated in Table 1 below. Each row of the column represents a single poll by the reader 108. The first column, labeled "Row," is added for purposes of convenience for this disclosure only.

TABLE 1

| Row | EPC | Read Counter | Poll Counter | APB Counter |
|---|---|---|---|---|
| 1 | null | null | null | null |
| 2 | 1234 | 1 | 4 | 0 |
| 3 | 1234 | 2 | 3 | 0 |
| 4 | 1234 | 3 | 2 | 6 |
| 5 | 1234 | 3 | 2 | 6 |
| 6 | 1234 | 3 | 2 | 6 |
| 7 | 1234 | 3 | 2 | 5 |
| 8 | 1234 | 3 | 2 | 4 |
| 9 | 1234 | 3 | 2 | 3 |
| 10 | 1234 | 3 | 2 | 2 |
| 11 | 1234 | 3 | 2 | 1 |
| 12 | 1234 | 3 | 2 | 0 |
| 13 | null | null | null | null |
| 14 | 4321 | 1 | 4 | 0 |
| 15 | 4321 | 2 | 3 | 0 |
| 16 | 4321 | 2 | 2 | 0 |
| 17 | 4321 | 2 | 1 | 0 |
| 18 | 4321 | 2 | 0 | 0 |
| 19 | null | null | null | null |

Rows 1 through 13 of Table 1 illustrate the anti-passback steps taken by reader 108 when an EPC tag is brought within read range of the reader 108, remains in range for several polling cycles, and then leaves read range. For purposes of illustration, assume the EPC tag is being used by a driver in a car who is seeking access to a parking structure.

Before the driver approaches the parking structure entrance, the entrance is clear (e.g., no other vehicles are in a read range of the reader 108 protecting the parking structure entrance). As a result, when the tag reader 108 at the parking structure entrance polls for data, it receives no response (row 1). The driver then pulls up next to the tag reader 108 and presents her EPC tag 104 within a read range of the reader 108. When the reader 108 again polls for data, it reads tag 104's identification data 140, which in this case is EPC 1234. Upon reading EPC 1234 for the first time, the reader 108 stores the read EPC in its table or data structure 124, sets the read counter 128 to 1, sets the poll counter 132 to a predetermined nonzero value (in this example, 4), and sets the APB counter 136 to 0 (row 2). As the driver continues to present her EPC tag 104, the EPC tag 104 remains in the reader 108's field, such that each time the reader 108 polls for data, its reads EPC 1234. As a result, the reader 108 increments the read counter 128 and decrements the poll counter 132 (rows 3 and 4). When the read counter 128 reaches the predetermined maximum (in this example, 3), the reader 108 sends EPC 1234 (or credentials associated therewith) to the access control panel (not shown) of access control system 100 for authentication, and sets the APB counter 136 to a predetermined value (in this example, 6) (row 4).

As long as the driver presents the EPC tag 104 to the reader 108, the reader 108, upon polling, continues to read EPC 1234 Once the read counter 128 has reached the predetermined maximum, however, the read counter 128 stays at that maximum (rows 5 and 6). And, as long as the APB counter 136 has a non-zero value, the reader 108 does not decrement the poll counter 132 (rows 5 and 6). Also as long as the APB counter 136 has a non-zero value, the reader 108 resets the APB counter 136 to its maximum value (in this example, 6) every time its reads EPC 1234 (rows 5 and 6).

Because polling happens on an interval periodic basis, typically measured in microseconds, the above events occur quickly with respect to user perception. When the driver is granted access to the parking structure, she enters, removing the EPC tag 104 from the reader 108's scanning field (which is usually on the order of 5 to 20 meters from the reader 108). Thus, as the reader 108 continues polling, it no longer reads EPC 1234. As a result, the reader 108 decrements the APB counter 136 after each poll (rows 7 through 12). When the APB counter 136 reaches 0 (row 12), the reader 108 purges EPC 1234 from the table or data structure 124, and sets each field to null (row 13).

Another car with a second EPC tag 104 for the parking structure's access control system 100 may then pass close by the access control system reader 108. If the reader 108, upon polling, reads the second EPC tag 104's identification data 140 (i.e. EPC 4321), it will create a table entry for EPC 4321 in table or data structure 124 and, as with EPC 1234, set the read counter 128 to 1, the poll counter 132 to 4, and the APB counter 136 to 0 (row 14). The second EPC tag 104 may stay within range for a second polling cycle, such that the read counter 128 increments and the poll counter 132 decrements (row 15). However, if the second EPC tag 104 passes out of range before the read counter 128 hits the predetermined maximum (in this example, 3), then the APB counter 136 will remain zero. As a result, the poll counter 132 will decrement after each polling cycle (rows 15-18). Once the poll counter 132 reaches zero, the reader 108 purges EPC 4321 from the table 124, and sets each field to null (row 19).

The predetermined maximum value of the read counter 128 may be selected by the access control system manufacturer or by a trusted individual, such as the access control system administrator. The value selected determines a minimum number of times the reader 108 must read the identification device 104 before sending the credentials associated with the device 104 to the access control panel for authentication. The lower the value, the greater the chance that credentials from a stray identification device 104 (i.e. one that does not belong to an individual seeking access) will be sent to the access control panel for authentication. The greater the value, the longer an individual seeking access must wait before his credentials are sent to the access control panel for authentication. These factors can be weighed depending upon the environment in which the reader 108 is situated.

The predetermined value of the poll counter 132 may be selected by the access control system manufacturer or by a trusted individual, such as the access control system administrator. The value selected determines how long (i.e. how many polling cycles) the reader 108 will attempt to read identification data 140 from a given identification device 104 before purging the table of the identification data 140 in question. If the value is lower, then an identification device 104 must be read by the reader 108 with a proportionately higher consistency to have the credentials encoded therein sent to the access control panel. If the value is higher, then an identification device 104 must be read by the reader 108 with a proportionately lower consistency to have the credentials encoded therein sent to the access control panel.

The predetermined value of the APB counter 136 may be selected by the access control system manufacturer or by a trusted individual, such as the access control system administrator. The value selected determines the length of time (i.e. how many polling cycles) that must pass before the identification device 104 can again be used to gain access through the access control system 100. A higher value will prevent the identification device 104 from being used again to gain access for a longer period of time than will a lower value.

Figure 2:
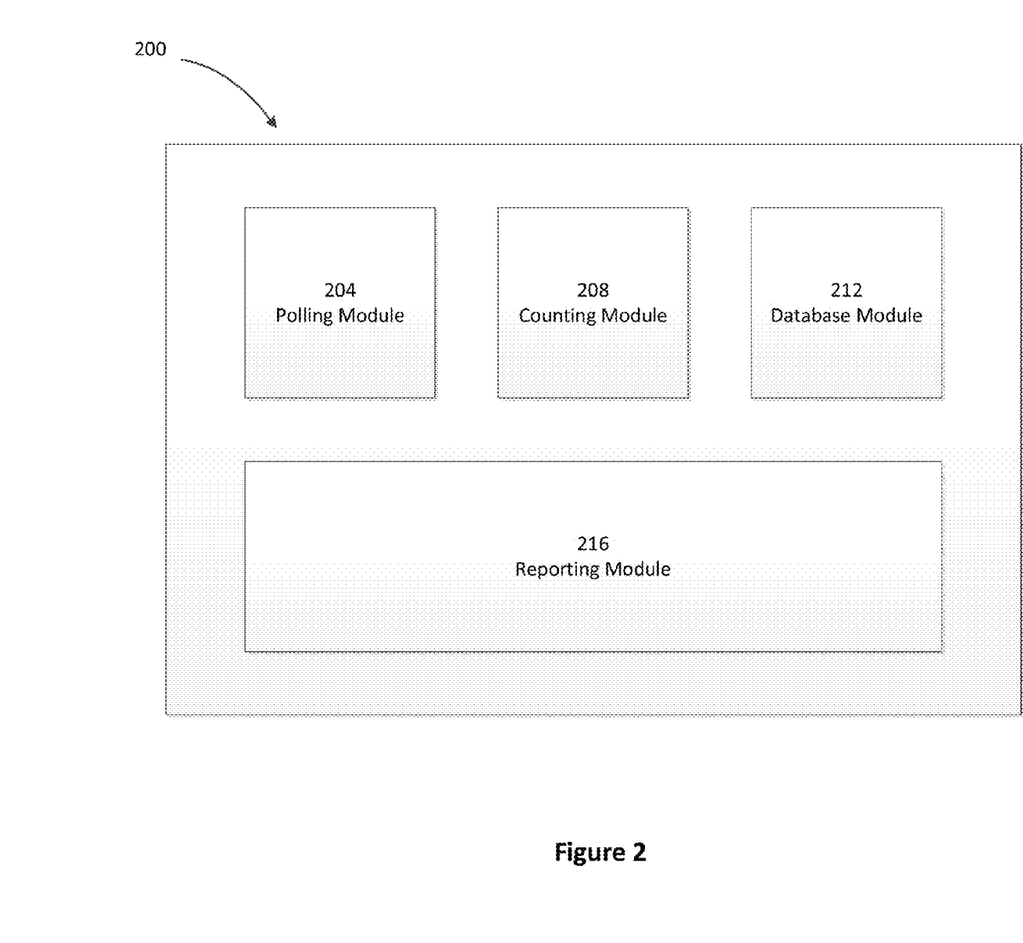
FIG. 2 is a block diagram of a reader according to one embodiment of the present disclosure.

Referring now to FIG. 2, an access control system reader 200 configured with an anti-passback mechanism according to embodiments of the present disclosure may comprise a polling module 204, a counting module 208, a database module 212, and a reporting module 216. Polling module 204 is configured to scan for and read an identification code from a data storage device (e.g. a credential or tag). Counting module 208 is configured to calculate a read counter value, a poll counter value, and an anti-passback counter value each time the polling module 204 conducts a scan. Database module 212 is configured to store the identification code read by the polling module 204, and is further configured to store the read counter value, the poll counter value, and the anti-passback counter value calculated by counting module 208 each time the polling module 204 conducts a scan. Reporting module 216 is configured to transmit identification information obtained from the data storage device to an access control panel of the access control system when the read counter value reaches a predetermined maximum read counter value.

In embodiments of the present disclosure, the counting module 208 of the reader 200 may be further configured to increment a read counter value when the polling module 204 reads an identification code from a credential or tag. In embodiments, the counting module 208 is further configured to decrement a poll counter value from an initial nonzero value each time the polling module 204 scans for an identification code, but only if the anti-passback counter value is equal to zero. Additionally, in embodiments, the counting module 208 is configured to decrement an anti-passback counter value each time the polling module 204 scans for an identification code, but only if the anti-passback value is nonzero.

Figure 3:
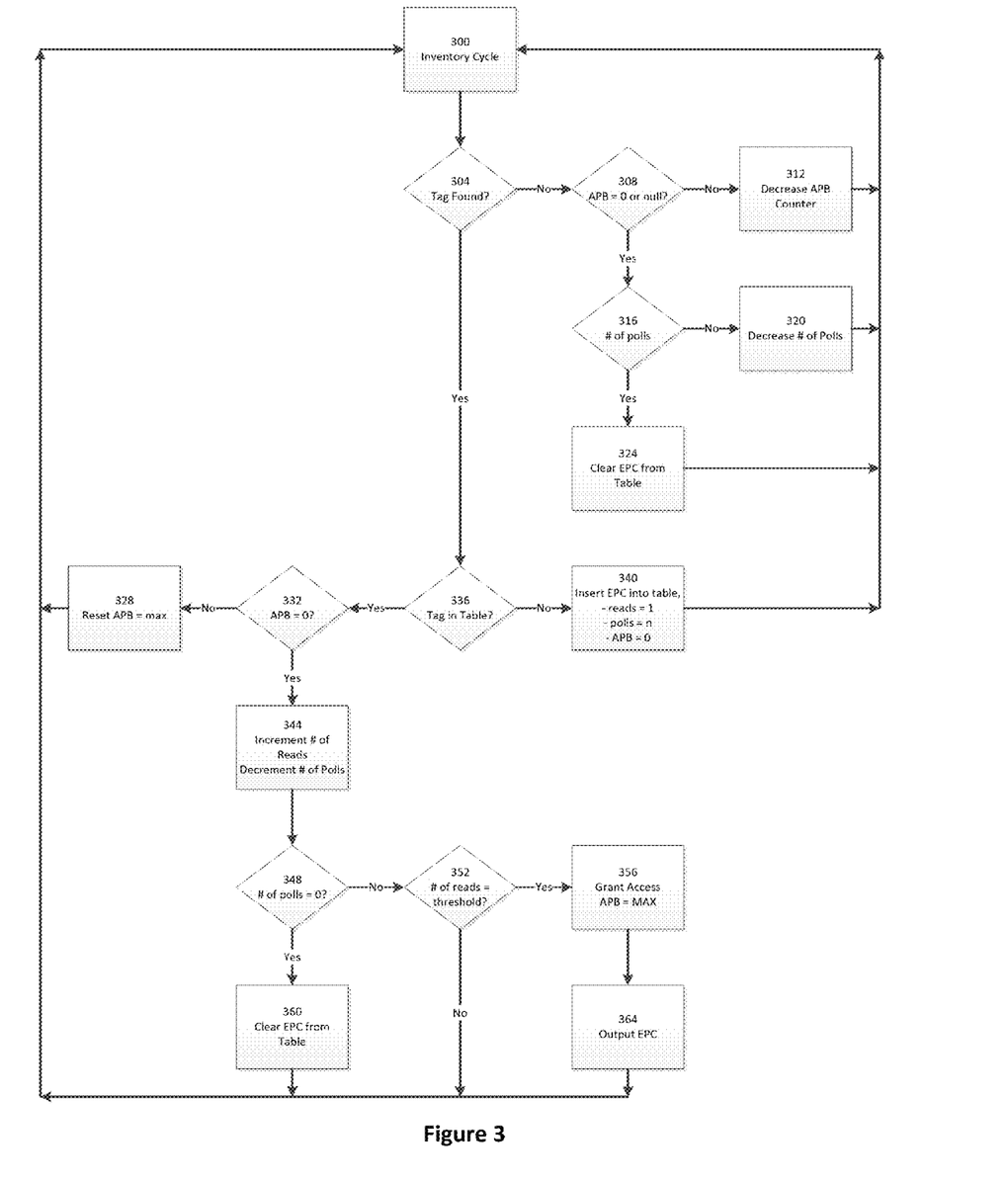
FIG. 3 is a flowchart depicting the operation of an anti-passback mechanism according to one embodiment of the present disclosure.

An embodiment of an anti-passback mechanism as implemented in an access control system having a card reader will be further described by reference to FIG. 3. Beginning at item 300, the card reader scans, or polls, for identification data from an identification card. If it recognizes ID data from a card (node 304), then it queries the data table to determine whether the ID data is already stored in the table (node 336). If the ID data is not already stored in the table, then the reader adds the ID data to the table, sets the read counter to 1, sets the poll counter to the predetermined value, and sets the APB counter to zero (node 340). If the ID data is in the table, then the reader queries the table to determine whether the APB counter associated with the ID data is zero (node 332). If the APB counter is not zero, then the reader sets the APB counter to the maximum value and restarts the process (node 328). If the APB counter is zero, then the reader increments the read counter and decrements the poll counter (node 344). If, after decrementing the poll counter, the poll counter value is zero, then the reader purges the ID data from the table and restarts the process (nodes 348, 360). If the poll counter value is not zero, then the reader evaluates whether the read counter has reached the predetermined maximum or threshold value (nodes 348, 352). If the read counter has reached the predetermined maximum value, then the reader sends the ID data (or credentials associated therewith) to the access control panel for authorization (which, if successful, will cause the access control system to grant access to the holder of the authorized tag), and sets the APB counter to the predetermined maximum value before restarting the process (node 356). If the read counter has not reached the maximum value, then the reader restarts the process (node 352).

If, upon scanning or polling, the card reader does not read ID data from an identification card, then the reader determines whether the APB counter for the most recently read ID data, if any, is zero (node 308). If the APB counter is not zero, then the reader decrements the APB counter and restarts the process (node 312). If the APB counter is zero, then the reader determines whether the poll counter is zero (node 316). If the poll counter is not zero, then the reader decrements the poll counter and restarts the process (node 320). If the poll counter is zero, then the reader purges the ID data from the table before restarting the process (node 324).

Figure 4:
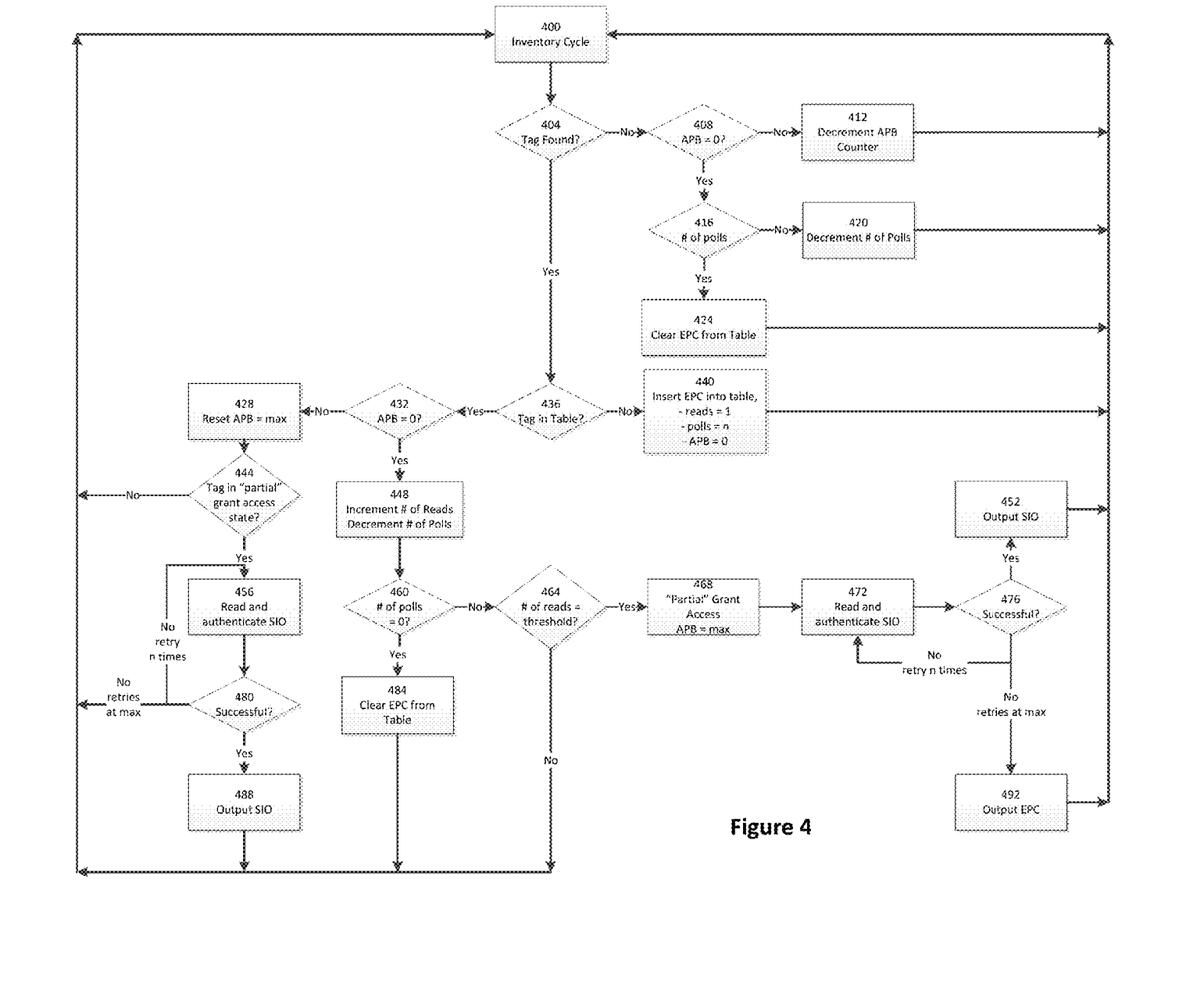
FIG. 4 is a flowchart depicting the operation of an anti-passback mechanism according to another embodiment of the present disclosure.

Referring now to FIG. 4, in some embodiments, once the ID data or associated credentials are forwarded to the access control panel for authorization, the reader will read and authenticate an SIO (node 472). If authentication is successful, the reader will output the SIO and access will be granted (node 452). If authentication is unsuccessful, then access will not be granted (node 476). In some embodiments, the access control system will retry the read and authentication process one or more times, granting access once authentication is successful but denying access if authentication remains unsuccessful once a predetermined maximum number of tries has been reached. The predetermined maximum number of tries may be set by the access control system manufacturer in some embodiments, or by a trusted individual in other embodiments. If the tag receives a "partial" access grant at node 468 but the reader never successfully reads and authenticates an SIO at node 472, then if the tag is found during the next inventory cycle 400 at node 404, the reader will determine at node 432 whether the anti-passback counter for that tag is 0. If not, the reader will reset the anti-passback counter to the predetermined maximum value (node 428) and will determine that the tag is in a "partial" grant access state (node 444). At that point, the reader will again attempt to read and authenticate an SIO for the tag (node 456) and, if authentication is successful, the reader will output the SIO and access will be granted (node 488). If authentication is unsuccessful, then access will not be granted (node 480).

Figure 5:
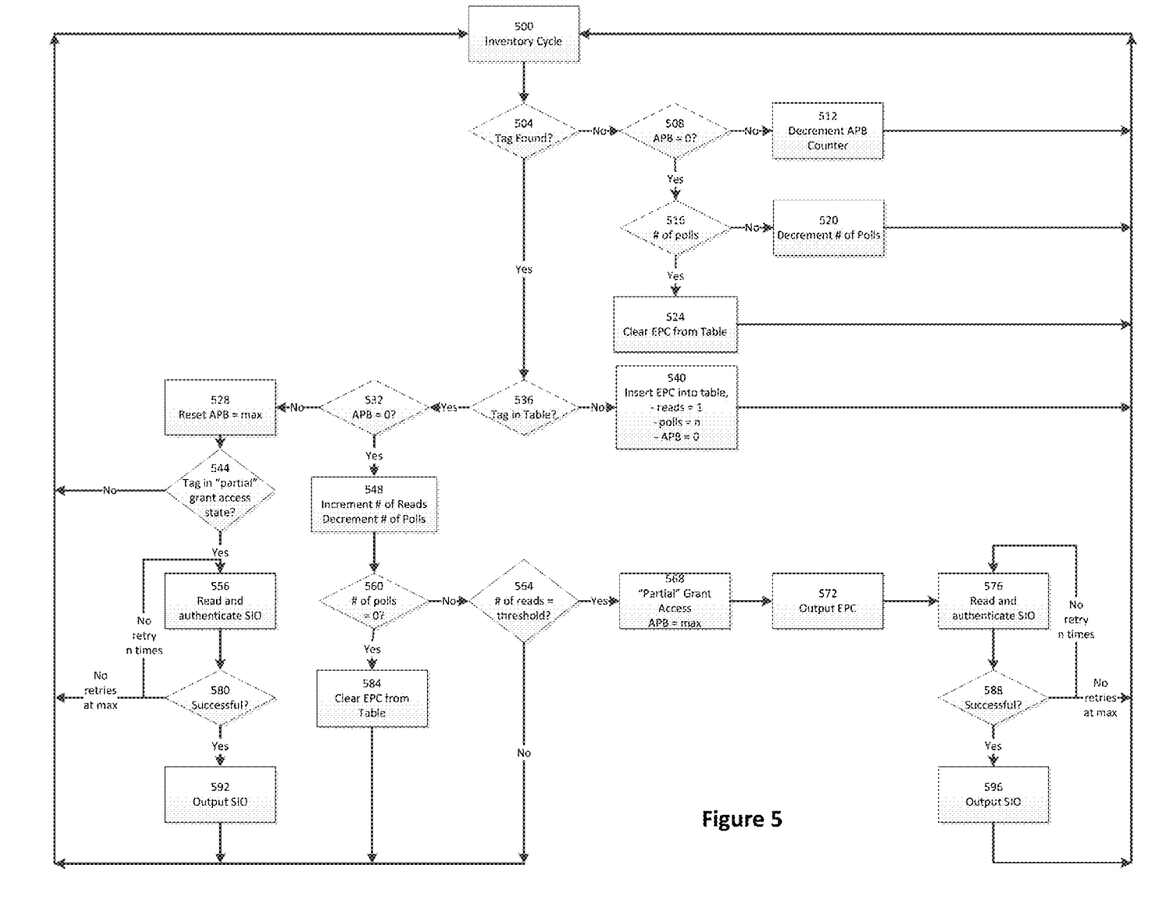
FIG. 5 is a flowchart depicting the operation of an anti-passback mechanism according to yet another embodiment of the present disclosure.

As evident from comparing FIGS. 4 and 5, in some embodiments the reader will output an SIO in conjunction with granting access (node 452) and an EPC if access is not granted (node 492), while in other embodiments the reader will output both an EPC and an SIO in the process of granting access (nodes 572, 596), and will not output either an EPC or an SIO if access is not granted. In other embodiments, the reader outputs an EPC (but not an SIO) in conjunction with granting access (as shown in FIG. 3, node 364).

In some embodiments, an access control system having anti-passback functionality as described herein includes a graphical user interface (whether on a reader associated with the access control system or on an administrative device of the access control system) containing various fields and/or controls such as those described in Table 2 below.

TABLE 2

| Field | Description |
|---|---|
| | Clock & Data |
| Bit Time (us) | Range: 0-40000. Default: 1500 Microseconds |
| Message Length | Range: 0-65525. Default: 210 |
| Leading Bits | Range: 0-255. Default: 25 |
| Grant Access Reads | Defines the number of times a tag must be read by the reader before the data is reported to the access control system panel. Range: 0-255. Default: 3.<br>Note: This field works together with the Grant Access Polls setting. |
| Grant Access Polls | Defines the number of reader polls after the first successful read of a tag, to achieve the required Grant Access Reads value defined above. Range: 0-255. Default: 25.<br>Note: The data will not be reported to the access control system panel if the reader cannot achieve the required number of reads within the defined number of polls. The combination of Grant Access Reads and Grant Access Polls ensures that a tag is in the reader's area of interest and not a passing vehicle or an environmentally influenced reflection. |
| Grant Access APB | Set the Anti-Passback for n polling. Range: 0-255. Default: 50.<br>Note: The reader will only send data to the access control system panel once for the period of time that the tag is read plus the time defined in this field. A tag that leaves and re-enters the field while APB is still active will not be reported and will reset the timer to the defined value. All tags that have been read and are active in the APB timer will be displayed in the Access Table on the Reader Information tab. |
| Data Output | SIO and EPC (Default)<br>SIO only<br>EPC only |
| Apply Changes | The Apply Changes button will apply any of the changes that have been made to the configuration (fields will be green) and save them to the configuration. Once saved the green fields should turn back to black. |

Using the graphical user interface, the access control system manufacturer or a trusted individual (e.g. an administrator of the access control system) can set the maximum values for the read counter, the poll counter, and the APB counter, and can select whether to output an SIO only, and EPC only, or both an SIO and an EPC in conjunction with granting access to an authorized tag. The administrator can also configure the bit time (i.e. polling interval), the message length to be used for communications among components of the access control system (e.g. between the reader and the tag), and the number of leading bits that will be included in each message. These configuration settings allow the anti-passback mechanism of a given access control system to be optimized for various applications with which the access control system might be used.

As can be seen from the above examples, the anti-passback mechanism disclosed herein is useful for preventing valid credentials from being used more than once in a given time period to gain access to an access controlled area. If an attempt is made to reuse the credentials after they have already been presented to the access control panel and before the APB counter has reached zero, then access is denied. The APB counter is then reset to its predetermined maximum value, thus extending the time during which the same credentials cannot be reused.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

What is claimed is:

1. A reader for an access control system, comprising:
an antenna configured to generate electromagnetic signals and facilitate information exchanges with one or more data storage devices that are presented within a read range of the reader;
a driver circuit configured to provide an excitation signal to the antenna at periodic intervals, thereby enabling the antenna to poll for one or more data storage devices within the read range at periodic intervals;
a processor configured to receive data from a tag in response to one or more polls by the antenna;
a poll counter that maintains a poll counter value corresponding to a number of times that the antenna polls for one or more data storage devices after the processor first receives the data from the tag;
a read counter that maintains a read counter value for a number of times that the processor receives the data from the tag in response to a poll;
an anti-passback counter that is assigned an anti-passback counter value of zero after the processor first receives the data from the tag; and
a data structure that maintains an identification code for the tag, the poll counter value, the read counter value, and the anti-passback counter value;
wherein the reader is configured to report tag identification information when the read counter value reaches a predetermined maximum read counter value.

2. The reader of claim 1, wherein:
the read counter is configured to increment the read counter value when the processor receives the data from the tag;
the poll counter is configured to decrement the poll counter value from an initial nonzero value each time the antenna polls for one or more data storage devices within the read range, but only if the anti-passback counter value is equal to zero; and
the anti-passback counter is configured to decrement the anti-passback counter value each time the antenna polls for one or more data storage devices within the read range, but only if the anti-passback value is nonzero.

3. The reader of claim 2, wherein the initial nonzero value is an integer value between 3 and 100.

4. The reader of claim 1, wherein the anti-passback counter is configured to set the anti-passback counter value to a nonzero predetermined maximum anti-passback counter value when the read counter value reaches the predetermined maximum read counter value.

5. The reader of claim 4, wherein the anti-passback counter is configured to set the anti-passback counter value to the nonzero predetermined maximum anti-passback counter value if the processor receives the data from the tag when the anti-passback counter value is nonzero.

6. The reader of claim 1, wherein at least one of the identification code and the identification information is an EPC.

7. The reader of claim 1, wherein at least one of the identification code and the identification information is an SIO.

8. The reader of claim 1, wherein the data structure is configured to clear the identification code, the read counter value, the poll counter value, and the anti-passback counter value when both the anti-passback counter value and the poll counter value are equal to zero.

9. The reader of claim 1, wherein the periodic interval is less than or equal to 40,000 microseconds.

10. The reader of claim 1, wherein the periodic interval is less than or equal to 1500 microseconds.

11. The reader of claim 1, wherein the data includes a message having only 210 bits.

12. The reader of claim 1, wherein the data includes only 25 leading bits.

13. A reader for an access control system, comprising:
an antenna configured to facilitate wireless information exchanges with one or more data storage devices that are within a read range of the reader;
a driver circuit configured to provide an excitation signal to the antenna at periodic intervals, each excitation signal enabling the reader to poll for one or more data storage devices within the read range at periodic intervals; and
a data structure comprising:
a read counter that maintains a read counter value for a number of times that the processor receives data from a tag in response to a poll;
a poll counter that maintains a poll counter value corresponding to a number of times that the reader polls for one or more data storage devices after the processor first receives the data from the tag; and
an anti-passback counter that is assigned an anti-passback counter value of zero after the processor first receives the data from the tag;
wherein the reader is configured to report tag identification information when the read counter value reaches a predetermined maximum read counter value.

14. The reader of claim 13, wherein the data structure stores an identification code of the tag.

15. The reader of claim 13, wherein the data comprises the tag identification information.

16. The reader of claim 13, wherein in response to first receiving the data from the tag, the read counter value is set to 1, the poll counter value is set to a predetermined nonzero value, and the anti-passback counter value is set to 0.

17. The reader of claim 13, wherein the anti-passback counter value is set to a predetermined nonzero value in response to the read counter value reaching the predetermined maximum read counter value.

18. The reader of claim 17, wherein the poll counter value does not change while the anti-passback counter value is nonzero.

19. The reader of claim 17, wherein the anti-passback counter resets to the predetermined nonzero value in response to receiving the data from the tag while the anti-passback counter value is nonzero.

20. A reader with anti-passback protection, comprising:
a communication interface comprising an antenna operably connected to a driver circuit, the driver circuit configured to provide an excitation signal to the antenna at periodic intervals, the periodic excitation signals causing the reader to periodically poll for one or more tags, wherein the antenna is configured to receive data from a tag in read range of the reader in response to one of the periodic polls; and
a data structure comprising:
storage for an identification code of the tag;
a read counter that maintains a read counter value for a number of times that the processor receives the data from the tag in response to one of the periodic polls;
a poll counter that maintains a poll counter value corresponding to a number of periodic polls conducted by the reader after the processor first receives the data from the tag; and
an anti-passback counter that is assigned an anti-passback counter value of zero after the processor first receives the data from the tag;
wherein the reader is configured to report tag identification information when the read counter value reaches a predetermined maximum read counter value.

* * * * *